March 11, 1958 — A. C. SCINTA — 2,825,917

CONNECTOR FOR WINDSHIELD WIPER BLADES

Filed July 1, 1954 — 2 Sheets-Sheet 1

INVENTOR.
ANTHONY C. SCINTA
BY
Beau, Brooks, Buckley & Beau,
ATTORNEYS.

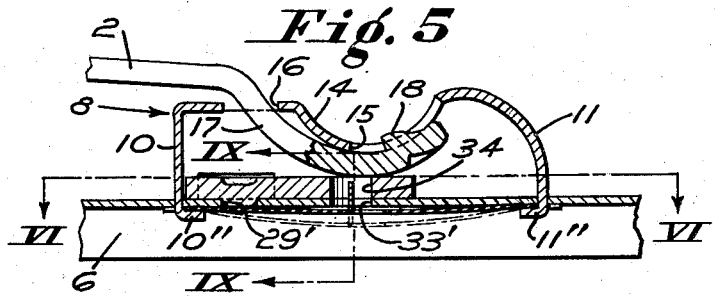
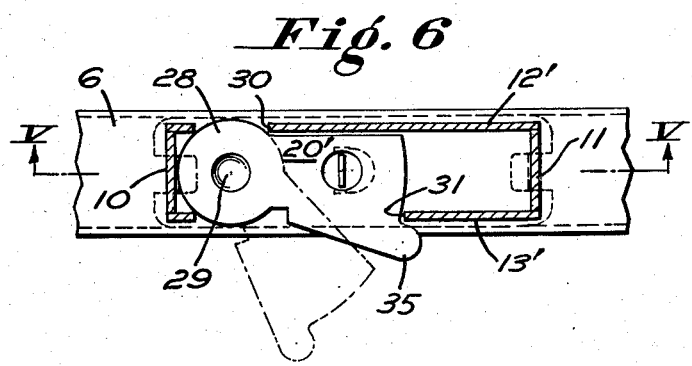
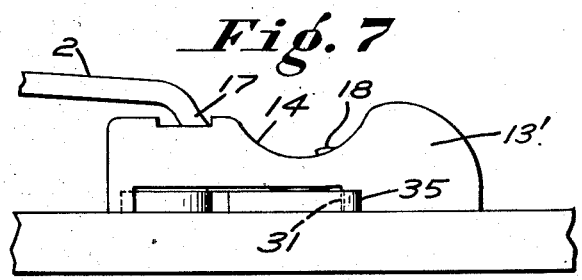
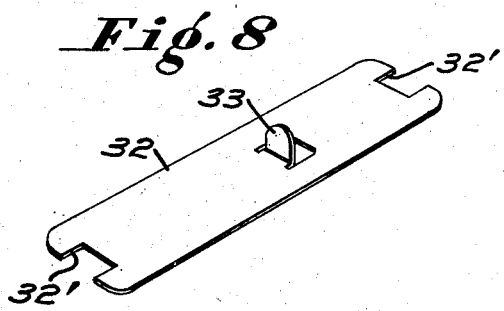
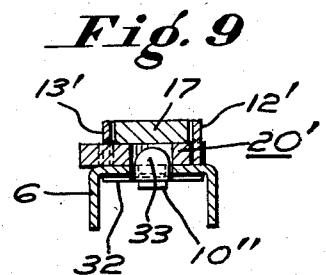

United States Patent Office 2,825,917
Patented Mar. 11, 1958

2,825,917

CONNECTOR FOR WINDSHIELD WIPER BLADES

Anthony C. Scinta, Buffalo, N. Y., assignor to Trico Products Corporation, Buffalo, N. Y.

Application July 1, 1954, Serial No. 440,738

17 Claims. (Cl. 15—250)

This invention relates generally to the windshield cleaner art, and more particularly to a new and useful coupler for releasably attaching a wiper blade to an actuating arm.

With the advent of the curved windshield and the use of wrap-around window surfaces turned back on a relatively sharp radius, it has been found that windshield wiper blades are subjected to unusual drag loads, as when the glass is only partially wetted. Under such circumstances, prior art couplers are prone to permit extraordinary roll over of the rubber blade body and its supporting superstructure, which condition is highly undesirable, and even dangerous, because it precludes proper wiping of the window glass and can cause scarring of the glass such as to ruin the same.

Conventional blades for curved windshields generally are supported by a flexible metal backing which has a width substantially equal to the depth of the rubber blade body therebeneath and which has marginal side edge portions projecting transversely outwardly beyond the side edges of the rubber blade body for engagement with the pressure-distributing superstructure. Upon extraordinary roll over the relatively thin wiping lip, normally serving as a fulcrum for the blade, collapses, and the fulcrum shifts from its normally centrally disposed position beneath the backing off to one side toward the leading edge of the blade. This causes additional rubber surface to come into contact with the glass which increases the drag load on the blade, with the result that the transversely projecting metal backing portions at the leading edge of the blade are brought into contact with the glass. Obviously, effective wiping cannot be achieved with the blade in this condition, and the metal parts contacting the glass will scar and in many instances ruin the windshield. This condition is particularly evident, and obnoxious, at the crest of the sharply curved contours of the glass when the blade is being pulled back around the crest and traveling uphill, so to speak, because this outward or rising movement of the blade results in increased arm pressure.

Accordingly, it is a primary object of this invention to provide a coupler means for securely but releasably attaching a wiper blade to its actuating arm which will give a positive control over rotation of the blade about its longitudinal axis, whereby to avoid the aforesaid undesirable roll over condition.

Another object of this invention is to provide coupler means for releasably attaching a wiper blade to its actuating arm, which means function in a dependable and sustained manner to permit only limited lateral rotational movement between the arm and the blade to thereby control the degree of lateral roll over the blade, while uniformly enabling transverse pivoting and lateral rocking movements of the blade under all wiping conditions.

It is also an object of this invention to provide a coupler means as aforesaid which will enable predetermined relative movement between the blade and its actuating arm for adjustment to the windshield inclination while providing a rigid mechanical lock positively preventing separation of the blade from its arm until deliberately released and positively precluding undesired roll over of the blade.

A further object of this invention is to provide a coupler as aforesaid which is of simple construction so as to be readily and inexpensively fabricated and assembled, which will remain in unlocked position to facilitate assembly of the blade on its arm, and which will remain in locking position to provide a secure though releasable attachment between the blade and its arm.

A coupler means according to the invention is characterized by the provision of dimensionally controllable attaching means providing a predetermined fit between the blade and its actuating arm enabling the blade to tip from end to end and thereby rock about a transverse axis to conform to the surface of the window glass while sustaining the blade against lateral pull or drag as the blade is moved across the window surface to allow but a limited rocking of the blade about its longitudinal axis.

More specifically, a coupler means according to the invention is characterized by the provision of dimensionally controllable members providing transversely flat opposed bearing surfaces for the arm end to enable pivoting of the blade about a transverse axis while bearing against diametrically opposed side edges of the arm end following a limited roll over of the blade to sustain the blade against lateral drag and against further roll over, one of said members being displaceable relative to the other thereof whereby to enable the insertion of an arm end into attaching position between said members.

The foregoing and other objects will become clearly apparent upon a perusal of the ensuing detailed description taken together with the accompanying drawings forming a part thereof wherein like reference numerals denote like parts throughout the various views and wherein:

Fig. 5 is a view similar to Fig. 2 but illustrating a modified form of attaching coupler according to the invention;

Fig. 6 is a view taken about on line VI—VI of Fig. 5;

Fig. 7 is a view in side elevation of the coupler of Fig. 5;

Fig. 8 is a perspective view of the resilient member utilized in the coupler of Fig. 5 to retain the locking member in locked position; and Fig. 9 is a view taken about on line IX—IX of Fig. 5.

Figure 1:
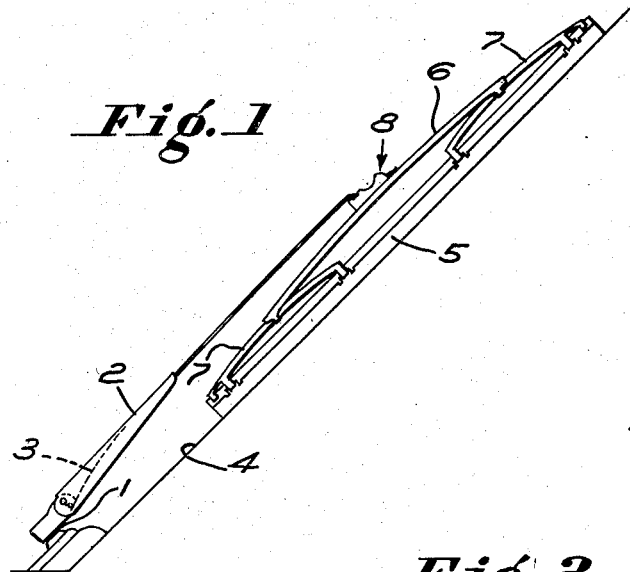
Fig. 1 is a view in side elevation of a windshield wiper utilizing an attaching coupler according to this invention installed in place on a vehicle window.

As illustrated in Fig. 1, a coupler according to this invention is adapted to be used in connection with a windshield cleaner of a known type comprising a rock shaft 1 actuated by a suitable motor, not illustrated, and an actuating arm 2 mounted on rock shaft 1 and including a spring 3 for urging the outer end of arm 2 toward the windshield 4. A wiper blade having a blade body or squeegee element 5 and a pressure distributing superstructure which comprises, for example, a primary yoke 6 and secondary yokes 7 pivoted thereto is connected to the terminal outer end of arm 2 by the coupler of this invention which is generally designated 8.

The particular wiper blade construction does not per se form a part of this invention, and consequently may be of any conventional form, although in the illustrated embodiment a blade adapted for curved windows is illustrated because of their prevalency today. Also, with the particular coupler shown it is desired that the blade body 5 have a flexible neck enabling the wiping edge portion to flop from one side to the other as the wiper is oscillated across a window surface.

In the embodiment of Figs. 1, 2, 3 and 4, the coupler 8 is seen to comprise a housing carried by the rigid primary yoke 6 which is of inverted channel form. The coupler housing has end walls 10 and 11, side walls 12 and 13, and a top wall having a curved bearing portion 14 of transversely flat concave form and an elongated slot or opening 14' providing a shoulder 15 therein. The top wall also has an opening 16 adjacent portion 14 permitting insertion of the outer terminal end 17 of arm 2 therein, which end is of transversely flat curved form adapted to nest against the curved portion 14 of the housing top wall and has a shoulder 18 adapted to engage against shoulder 15 of the housing top wall to prevent retraction of the arm from the housing when arm end 17 and wall portion 14 are in nested relation.

The lower portion of end wall 11 is recessed on opposite sides thereof to provide a tongue 11' of reduced width which extends through an opening in yoke 6 and terminates in an inturned tab 11'' thereunder, and the lower end of side wall 10 extends through an aperture in yoke 6 and terminates in an inturned tab 10'', the tabs 10'' and 11'' serving to secure the coupler 8 on yoke 6.

Figure 4:
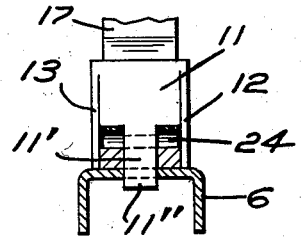
Fig. 4 is a view taken about on line IV—IV of Fig. 2.
Figure 2:
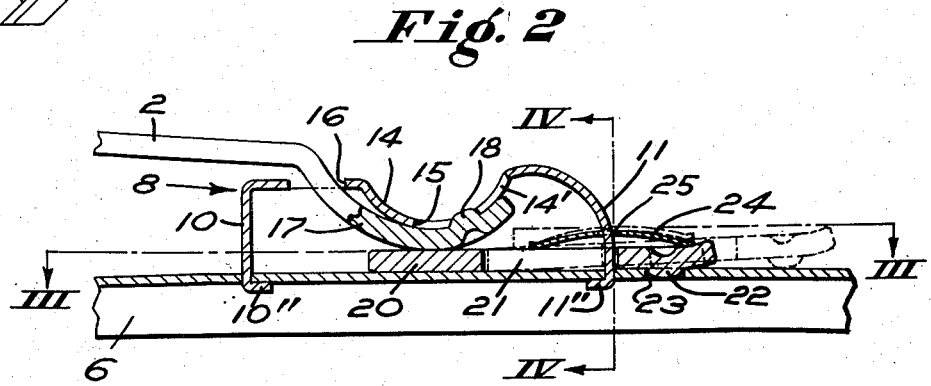
Fig. 2 is an enlarged detail view in longitudinal section of one embodiment of an attaching coupler according to this invention.
Figure 3:
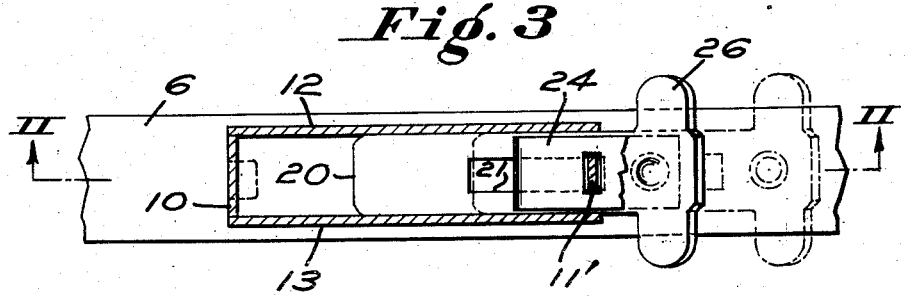
Fig. 3 is a view taken about on line III—III of Fig. 2.

In accord with the invention, means are provided for rigidly locking arm end 17 against movement out of nested relation with the housing wall portion 14 and for controlling lateral roll over of the blade while enabling certain predetermined movement between the blade and the arm, and in the embodiment of Figs. 2–4 such means comprise a rigid locking and bearing plate 20 slotted, as at 21, with the housing end wall tongue 11' extending through slot 21. In this way, plate 20 is secured against accidental disengagement from the housing while being movable relative thereto by virtue of the pin and slot connection. Plate 20 is slidable along yoke 6 between a retracted or unlocking position illustrated in broken lines and a locking position illustrated in full lines in Figs. 2 and 3, and when plate 20 is moved into locking position its inner end portion is positioned beneath the arm end 17 and provides a transversely flat bearing surface which receives the arm pressure and rigidly blocks the arm from movement out of nested relation with wall portion 14. Plate 20 is of a thickness permitting a slight clearance or play between arm end 17 and top wall portion 14, such as on the order of a sixteenth of an inch, whereby to enable relative sliding movement of wall portion 14 on the arm end 17 to permit self-adjustment of the blade to the varying inclination of a windshield and of different windshields, which clearance is of course far less than the extent of shoulder 18 whereby arm end 17 and wall part 14 are rigidly locked in nested relation and arm end 17 cannot be retracted from the clip housing.

It will be observed that plate 20, in addition to its function as a locking member, is a bearing member providing a bearing surface for the underside of the arm end. Thus, top wall portion 14 and plate 20 provide opposed and transversely flatted bearing surfaces between which the transversely flat arm end is confined and which, by reason of the aforesaid slight clearance therebetween, enable rocking of the blade about a transverse axis for self-adjustment of the blade to the window inclination while bearing against diametrically opposed side edge portions of the arm end to upon predetermined, limited lateral roll over the blade sustain the blade against lateral drag and positively preclude roll over of the blade.

Plate 20 is provided with a detent 22 for engaging an aperture 23 in yoke 6 when plate 20 is in its locking position, and a bowed spring member 24, of greater width than slot 21 and aperture at 25 to receive the end wall tongue 11' for being locked to the clip housing, bears against the upper full width portion of end wall 11 and against plate 20 whereby to resiliently urge plate 20 against yoke 6 for resiliently retaining detent 22 in aperture 23.

Plate 20 is provided at its outer end with ears 26 adapted to be manually grasped for sliding plate 20 in a direction outwardly from the clip housing to its unlocking position illustrated in broken lines in Figs. 2 and 3 wherein it will be observed that the inner end of plate 20 is moved out of the way of arm end 17 whereby the same can be moved away from wall part 14 sufficiently to permit insertion and retraction of the arm end through opening 16.

The attaching clip or coupler thus described has manifold advantages. The blade is securely locked to the arm by rigid means, whereby accidental disconnection thereof is precluded, and is effectively sustained against lateral drag whereby to preclude undesired roll over. At the same time, the locking member can be retracted when desired without requiring special tools whereby to enable ready disconnection of the blade. Also, the locking member is secured to the clip housing, as is the spring member, whereby the various parts of the clip will not become separated, and furthermore the spring at all times urges the locking member against the pressure distributing yoke whereby to avoid rattling thereof and whereby to resiliently retain the locking plate in its locking position once it has been so positioned. In addition, the clip comprises a minimum of parts which are readily formed.

The embodiment of Figs. 5 through 9 retains the advantages and principle of operation of the embodiment of Figs. 2 through 4 while differing therefrom in certain details of construction.

In this embodiment, the housing end wall 11 is not recessed to provide the tongue 11', although it has the inturned tab 11'', and instead of a plate slidable through the end wall 11 of the housing there is provided a locking and bearing plate 20' pivoted within the housing and movable through a side wall thereof. To this end, plate 20' is formed at one end thereof to provide a circular portion 28 having a detent 29 centrally thereof fitted in an aperture 29' in yoke 6 to provide a pivot. Side wall 12' is slotted, as at 30 to receive part of the circular portion 28 and to constrain the same against movement away from yoke 6 whereby detent 29 remains in the yoke aperture, and side wall 13' is slotted to a considerable greater extent, as at 31, to receive the opposite side of circular portion 28 and also to permit plate 20' to be swung outwardly therethrough to its unlocking position illustrated in broken lines in Fig. 6.

Plate 20' is movable across yoke 6, and it will be noted that when plate 20' is swung to its locking position within the housing, that being the position illustrated in full lines in Fig. 6, it provides a transversely flat bearing surface for the terminal end 17 of arm 2 which blocks the arm end from movement out of nested relation with the curved top wall portion 14 of the housing, as described in connection with the embodiment of Figs. 2 through 4, and, as in that embodiment, there is a slight play or clearance on the order of a sixteenth of an inch enabling the curved wall portion 14 to slide lengthwise of the arm on the arm end 17 to vary the inclination of the blade on the arm while the transversely flat plate and top wall portion positively control rocking of the blade about its longitudinal axis.

A flat spring member 32 extends along the under side of yoke 6, being notched at its opposite ends as at 32' to receive the lower part of end walls 10 and 11, with tabs 10'' and 11'' fitting thereunder, as clearly illustrated in Fig. 5, to retain spring 32 in position against the underside of yoke 6. Spring 32 is provided with an upturned tab 33 extending through an aperture 33' in yoke 6 and into an aperture 34 in plate 20' to resiliently retain the same in its locking position, tab 33 having a curved upper edge for being cammed out of aperture 34 when plate 20' is deliberately moved from one position to the other.

When it is desired to disconnect the blade from the arm, plate 20' is pivoted to its broken line position shown in Fig. 6, this being accomplished by grasping the tab 35 on the end of plate 20' remote from its pivot and swinging the locking plate outwardly, and tab 35 is directed substantially lengthwise of the blade to enable the insertion of a screwdriver or similar tool between housing side wall 13' and tab 35 for camming the latter outwardly if necessary.

Accordingly, it will be seen that this invention fully accomplishes the aforesaid objects, and provides an extremely practical, relatively simple and inexpensive, and highly reliable blade attaching clip which will preclude undesired roll over while enabling rocking about a transverse axis and which will effectively preclude accidental disconnection of the blade from the arm while being readily manipulated to disconnect the same when desired. Although only two embodiments of the invention have been disclosed herein the invention is not necessarily limited thereto or to the details thereof, and can be adapted to arm ends of different form, and it is intended that the scope of this invention be defined by the appended claims.

Having fully disclosed and completely described this invention, together with its mode of operation, what is claimed as new is:

1. A coupler for securing a wiper blade to the shouldered end of an actuating arm comprising, housing means adapted to be secured to said blade and having a shouldered part therein for receiving the shouldered arm end thereagainst in interlocking relation therewith, means defining an opening in said housing for insertion of the arm end therein, and rigid locking means slidable within said housing into and out of locking position, said locking means providing a substantially unyielding bearing surface receiving wiping pressure from the arm end and preventing separation of the arm end from said shouldered housing part when in locking position, and means for releasably retaining said locking means in said locking position.

2. A coupler for releasably attaching a wiper blade to an actuating arm having a shouldered terminal end comprising, in combination with a wiper blade having a flexible blade body and a pressure distributing structure therefor, a housing carried by said structure, said housing having an opening for inserting the arm end therein and a shouldered top wall part substantially conforming to the arm end for receiving the same thereagainst in interlocking relation therewith, a rigid bearing plate member movable on said structure into and out of a locking position beneath said top wall part and the arm end thereagainst for blocking the arm end against separation therefrom, said member when in said locking position providing a substantially unyielding bearing surface receiving wiping pressure from the arm end and transmitting it to said pressure distributing structure, and means for releasably securing said plate member in said locking position.

3. A coupler for releasably attaching a wiper blade to the shouldered end of an actuating arm comprising, a substantially rigid member, a chamber defining housing carried by said member, said housing having an opening for inserting the arm end into the chamber and a shouldered top wall part for receiving the arm end thereagainst in interlocking relation therewith, rigid bearing plate means extending through a wall of said housing and slidable in said chamber between locking and unlocking positions, said plate means when in locking position being between the arm end and said member and providing beneath the arm end a substantially unyielding bearing surface for the arm end precluding movement of the arm end away from said top wall part out of interlocking relation therewith, and means for releasably retaining said bearing plate means in said locking position.

4. An attaching clip for releasably coupling a wiper blade to an actuating arm having a shouldered terminal end of transversely flat concave form comprising, in combination with a blade having a pressure distributing structure and a flexible blade body carried thereby, a housing carried by said structure and having a shouldered top wall portion of transversely flat concave form providing a first bearing surface for nesting with the arm end, means defining an opening in said housing for inserting the arm end therein, and a transversely flat bearing plate slidable on said structure into and out of a locking position between said top wall portion and said structure for preventing movement of the arm end out of nested relation with said top wall portion while permitting limited relative sliding movement therebetween, said bearing plate when in backing position providing a substantially unyielding second bearing surface transmitting arm delivered wiping pressure to said structure.

5. An attaching clip for releasably coupling a wiper blade to an actuating arm having a shouldered terminal end of concave form comprising, in combination with a blade having a holder structure and a blade body carried thereby, a housing carried by said structure and having a shouldered top wall portion of concave form for nesting with the arm end, means defining an opening in said housing for inserting the arm end therein, and a plate movable on said structure into and out of a locking position between said top wall portion and said structure for preventing movement of the arm end out of nested relation with said top wall portion while permitting limited relative sliding movement therebetween, said plate being pivoted on said structure and movable through a slotted side wall part of said housing into and out of said locking position.

6. An attaching clip for releasably coupling a wiper blade to an actuating arm having a shouldered terminal end of concave form comprising, in combination with a blade having a holder structure and a blade body carried thereby, a housing carried by said structure and having a shouldered top wall portion of concave form for nesting with the arm end, means defining an opening in said housing for inserting the arm end therein, and substantially rigid bearing plate means movable on said structure into and out of a locking position between said top wall portion and said structure for preventing movement of the arm end out of nested relation with said top wall portion while permitting limited relative sliding movement therebetween, said plate means being secured to an end wall of said housing with a pin and slot connection precluding separation of said plate means from said housing while enabling such movement thereof on said structure.

7. A coupler for releasably connecting a wiper to the shouldered end of an actuating arm comprising, in combination, a wiper having a pressure distributing structure and a flexible blade body carried thereby, a chamber defining housing carried by said structure, means defining an opening in said housing for inserting the arm end into the chamber, said housing having a shouldered wall part for receiving in interlocking relation therewith the shouldered arm end, rigid locking plate means constrained between said housing and said structure against separation therefrom while being movable on said structure into and out of a locking position in said chamber, said locking plate means providing a substantially unyielding bearing transmitting wiping pressure from the arm end to said structure and preventing separation of the arm end from said shouldered wall part when in said locking position, and means releasably securing said locking plate means in said locking position.

8. A connector for releasably coupling a wiper blade to an actuating arm of the type terminating in a curved tongue having a shoulder thereon comprising, in combination, a wiper blade having a substantially rigid pressure distributing member, a housing carried on said member, said housing having a top wall formed with a tongue receiving opening and a shouldered portion curved to nest with such a tongue in interlocking relation therewith, a rigid and substantially flat locking plate confined between said member and a recessed wall part of said housing for predetermined movement on said member into and out of a locking position precluding movement of the arm tongue out of nested interlocking relation with said curved top wall portion while enabling limited relative movement therebetween, said locking plate providing a substantially unyielding bearing for the arm tongue when in locking position, and means for releasably securing said plate in said locking position.

9. A connector for releasably coupling a wiper blade an an actuating arm comprising, a wiper blade having a substantially rigid pressure distributing member, a housing carried on said member, said housing having a shouldered top wall part curved to nest with a shouldered arm tongue of curved form and an opening adjacent thereto for inserting the arm tongue into said housing, a rigid locking plate having a slot therein movable on said member, said housing having an end wall formed with a portion of reduced width extending through the slot in said plate to secure the same against disassembly from said housing while enabling movement of said plate within said housing into and out of a locking position wherein said plate blocks the arm tongue against separation from said curved wall part, and means releasably securing said locking plate in said locking position.

10. A connector for releasably coupling a wiper blade and an actuating arm comprising, a wiper blade having a substantially rigid member, a housing carried on said member, said housing having a shouldered top wall part curved to nest with a shouldered arm tongue of curved form and an opening adjacent thereto for inserting the arm tongue into said housing, a rigid locking plate having a slot therein movable on said member, said housing having an end wall formed with a portion of reduced width extending through the slot in said plate to secure the same against disassembly from said housing while enabling movement of said plate within said housing into and out of a locking position wherein said plate blocks the arm tongue against separation from said curved wall part while enabling limited relative movement therebetween, and means releasably securing said locking plate in said locking position, said last-named means comprising said spring means carried by said end wall portion for urging said plate against said member, and cooperating detent means on said plate and on said member engaging and releasably interlocking the same when said plate is in said locking position.

11. A connector for detachably coupling a wiper to an actuating arm having a shouldered outer end comprising, a wiper blade having a pressure-distributing member carrying a flexible blade body, a housing carried on said member, said housing having a shouldered wall part for interlocking with the arm end and an opening adjacent thereto for inserting the arm end into said housing, a rigid locking plate having a slot therein, said housing having an end wall formed with a portion of reduced width extending through said slot for securing said plate against separation from said housing while enabling movement of said plate along said member into and out of a locking position within said housing for maintaining the arm end in interlocking relation with said shouldered wall part, a spring member of bowed form slotted to receive said end wall portion therethrough and bearing against said plate to urge the same against said pressure-distributing member, said pressure-distributing member and said plate being formed one with a detent and the other with an aperture for cooperating under the bias of said spring member to releasably maintain said plate in said locking position.

12. An attaching clip for releasably coupling a wiper blade to an actuating arm having a shouldered terminal end of curved form comprising, in combination with a blade having a pressure distributing member and a flexible blade body carried thereby, a housing carried by said member and having a shouldered top wall portion of curved form for nesting with such an arm end, means defining an opening in said housing for inserting the arm end therein, and a locking plate movable on said member into and out of a locking position between said top wall portion and said member for preventing movement of the arm end out of nested relation with said top wall portion, said locking plate having an end portion extending into a recessed wall part of said housing and being formed with a detent engaging a recess in said member to form a pivot for said plate, said recessed housing wall part constraining said plate against said member to maintain the pivot engagement.

13. An attaching clip for releasably coupling a wiper blade to an actuating arm having a shouldered terminal end of curved form comprising, in combination with a blade having a pressure distributing member and a flexible blade body carried thereby, a housing carried by said member and having a shouldered top wall portion of curved form for nesting with such an arm end, means defining an opening in said housing for inserting the arm end therein, and a locking plate movable on said member into and out of a locking position between said top wall portion and said member for preventing movement of the arm end out of nested relation with said top wall portion, said locking plate having an end portion extending into a recessed wall part of said housing and being formed with a detent engaging a recess in said member to form a pivot for said plate, said recessed housing wall part constraining said plate against said member to maintain the pivot engagement, and a spring member carried beneath said pressure distributing member and having a tab portion formed with a curved upper edge extending through an aperture in said pressure-distributing member and into a recess in said plate for releasably securing the same in said locking position.

14. An attaching clip for releasably coupling a wiper blade to an actuating arm having a shouldered terminal end of curved form comprising, in combination with a blade having a pressure distributing member and a flexible blade body carried thereby, a housing carried by said member and having a shouldered top wall portion of curved form for nesting with such an arm end, means defining an opening in said housing for inserting the arm end therein, and a locking plate movable on said member into and out of a locking position between said top wall portion and said member for preventing movement of the arm end out of nested relation with said top wall portion, said locking plate having an end portion extending into a recessed wall part of said housing and being formed with a detent engaging a recess in said member to form a pivot for said plate, said recessed housing wall part constraining said plate against said member to maintain the pivot engagement, and a spring member carried beneath said pressure distributing member and having a tab portion formed with a curved upper edge extending through an aperture in said pressure-distributing member and into a recess in said plate for releasably securing the same in said locking position, said plate being formed with a tab part extending exteriorly of said housing when said plate is in said locking position to permit insertion of a tool between said tab part and a housing side wall part for forcing said plate to unlocking position.

15. An attaching clip for releasably coupling a wiper blade to an actuating arm having a shouldered terminal end of curved form comprising, in combination with a blade having a pressure distributing member and a flexible blade body carried thereby, a housing carried by said member and having a shouldered top wall portion of curved form for nesting with such an arm end, means defining an opening in said housing for inserting the arm end therein, and a locking plate movable on said member into and out of a locking position between said top wall portion and said member for preventing movement of the arm end out of nested relation with said top wall portion, said locking plate having an end portion extending into a recessed wall part of said housing and being formed with a detent engaging a recess in said member to form a pivot for said plate, said recessed housing wall part constraining said plate against said member to maintain the pivot engagement, and a spring member carried beneath said pressure distributing member and having a tab portion formed with a curved upper edge extending through an aperture in said pressure-distributing member and into a recess in said plate for releasably securing the same in said locking position, said pressure distributing member being of inverted channel form for receiving said spring member therein.

16. In a coupler for releasably attaching a wiper blade to an actuating arm having a transversely substantially flat outer end, means carried by the blade providing opposed transversely substantially flat rigid and unyielding bearing surfaces between which the arm end is confined with a predetermined slight clearance to enable rocking of the blade about a transverse axis while sustaining the blade against lateral drag, one of said bearing surfaces being bodily displaceable relative to the other thereof to enable insertion of the arm end therebetween and removal of the arm end therefrom.

17. In a coupler for releasably attaching a wiper blade to an actuating arm having a shouldered attaching part of transversely flat concave form, means carried by the blade providing a shouldered bearing surface of transversely flat concave form for nesting with such arm part, and a bearing member carried by the blade and providing a transversely flat and substantially unyielding bearing surface opposed to said shouldered bearing surface and between which the arm part is confined in a manner maintaining the arm part and the shouldered bearing surface interlocked in nested relation, said bearing member being bodily movable relative to said shouldered bearing surface in a plane substantially parallel to a plane substantially tangent to said shouldered bearing surface whereby to enable insertion of the arm part between said opposed bearing surfaces.

References Cited in the file of this patent

UNITED STATES PATENTS

| | | |
|---|---|---|
| 2,432,689 | Smulski | Dec. 16, 1947 |
| 2,643,410 | Nesson | June 30, 1953 |
| 2,703,900 | Nesson | Mar. 15, 1955 |